Nov. 1, 1938.  F. T. COURTNEY  2,135,033
AIRPLANE LAUNCHING
Filed Aug. 31, 1936  3 Sheets-Sheet 1
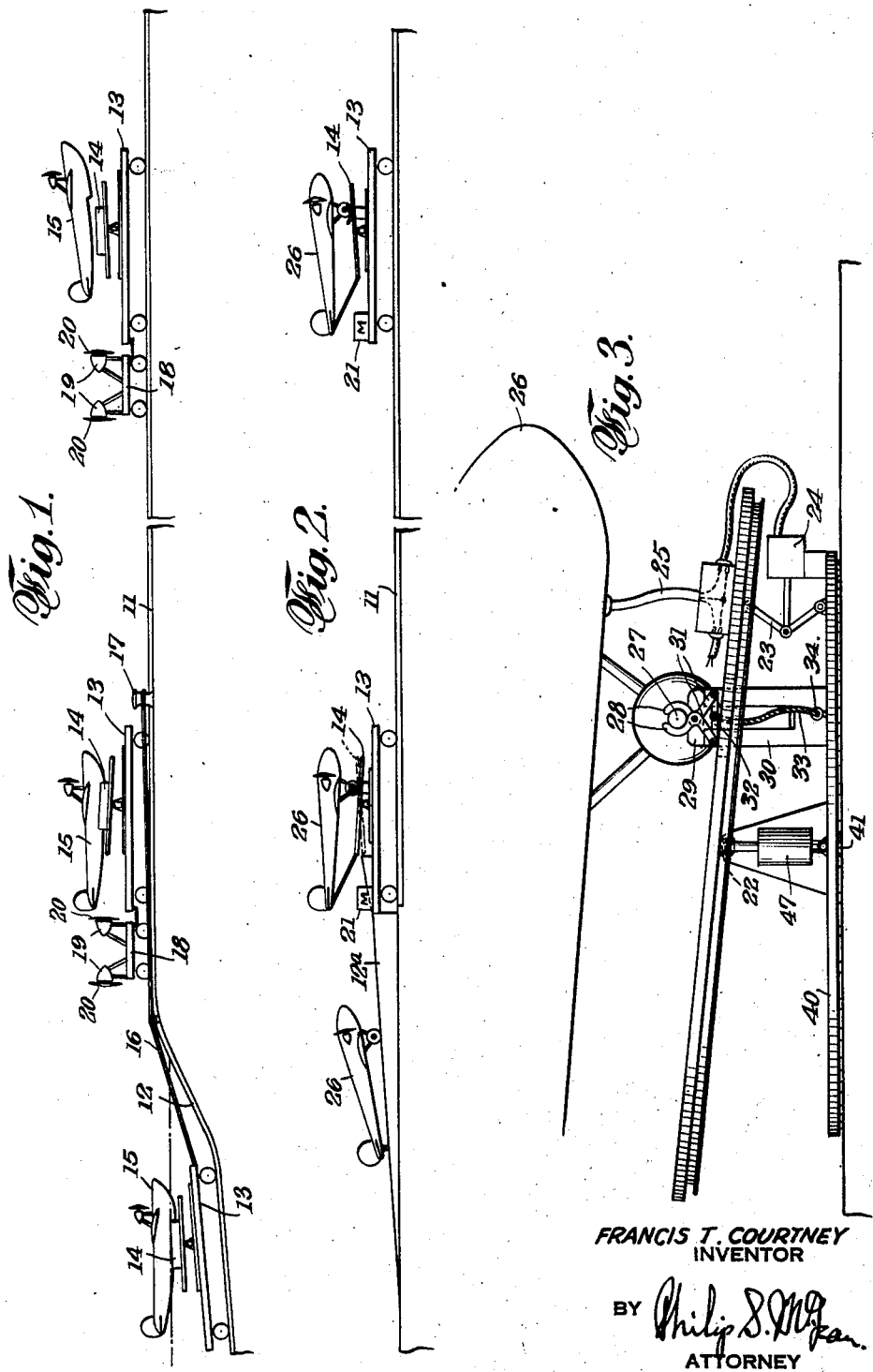
FRANCIS T. COURTNEY
INVENTOR
BY
ATTORNEY

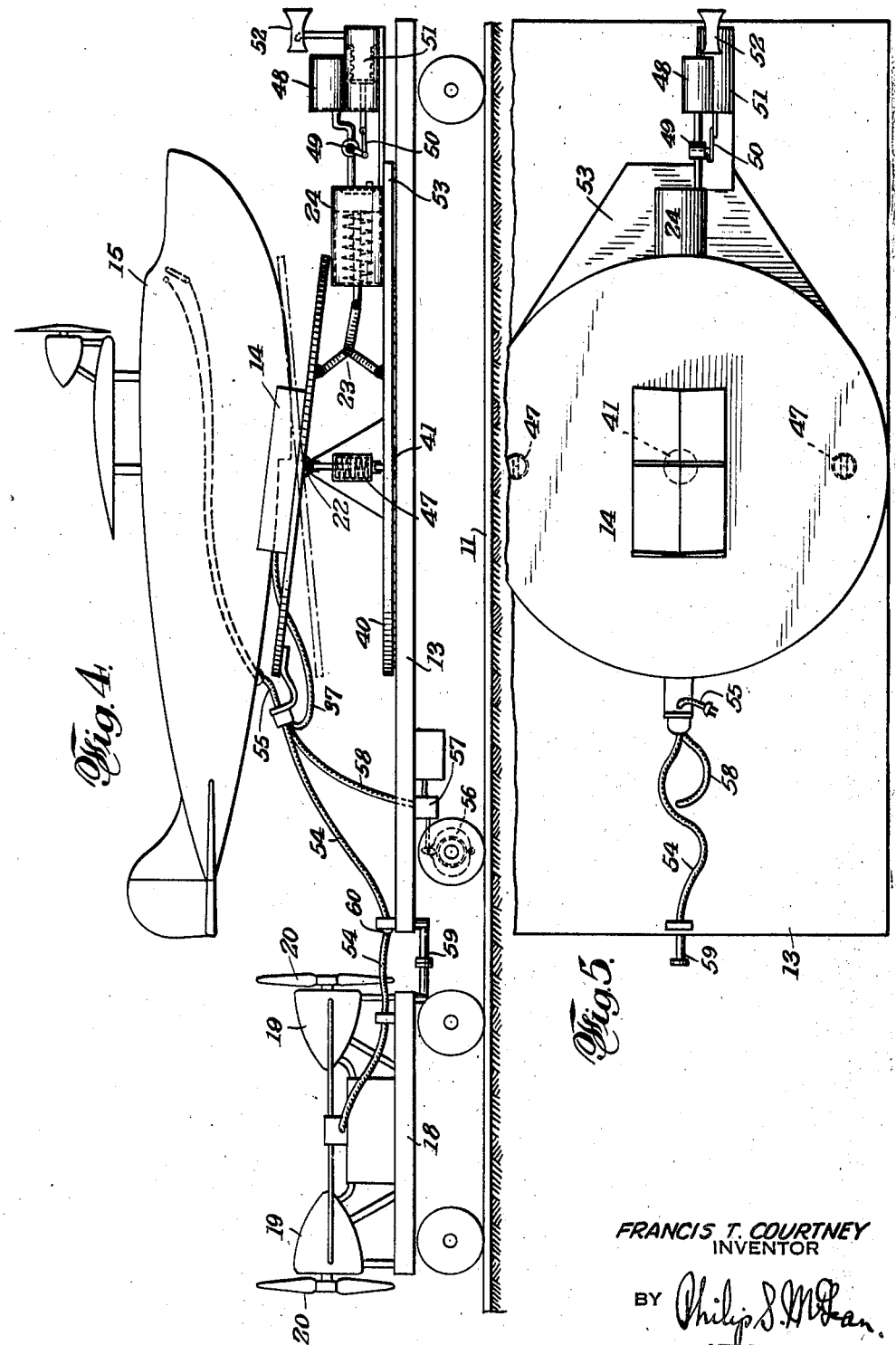

Nov. 1, 1938.    F. T. COURTNEY    2,135,033
AIRPLANE LAUNCHING
Filed Aug. 31, 1936    3 Sheets-Sheet 3
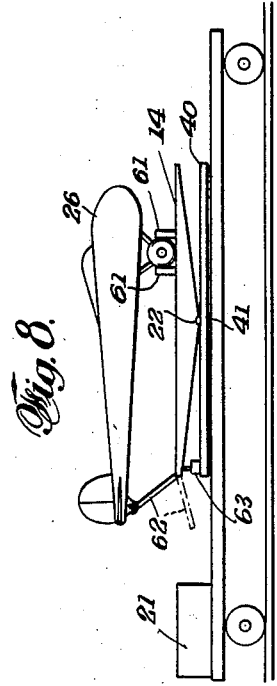
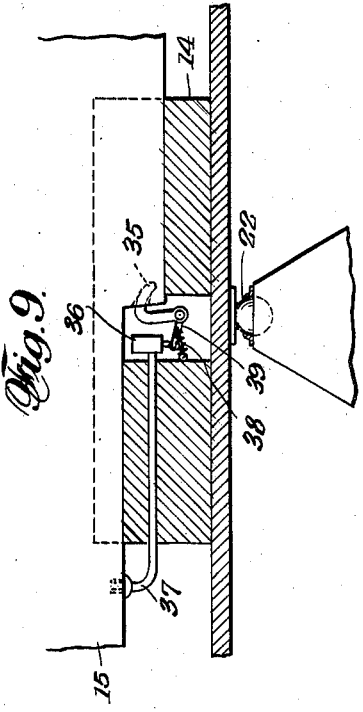
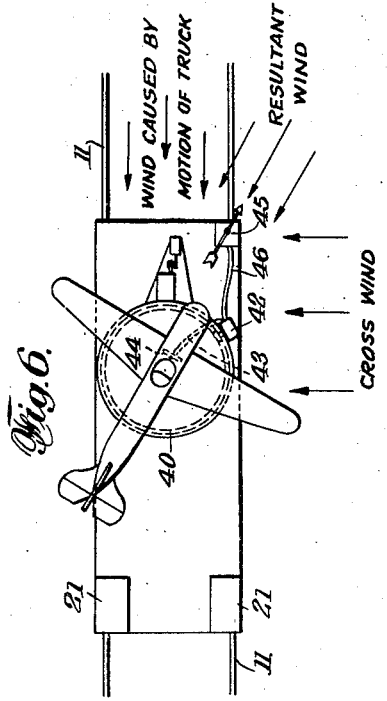
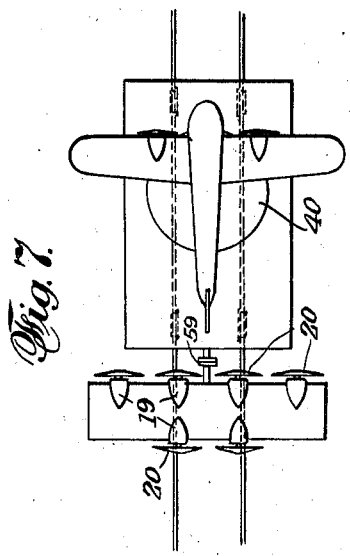
FRANCIS T. COURTNEY
INVENTOR Patented Nov. 1, 1938

2,135,033

UNITED STATES PATENT OFFICE 2,135,033

AIRPLANE LAUNCHING

Francis T. Courtney, Great Neck, N. Y.

Application August 31, 1936, Serial No. 98,692

17 Claims. (Cl. 244—63)

This invention relates to the launching of airplanes.

For economical airplane operation it is desirable that a given wing area be made to carry as much load as reasonably possible. Increasing the loading raises the minimum speed at which the wing can sustain the load and hence the speed at which the plane must land and take off. Wing loading, therefore, is usually limited by the safe landing speed for the type of plane under consideration.

Where a heavy load of fuel is carried, as in long range airplane flights or for bomb carrying and other military purposes, it can be assumed that such loads will have been disposed of before the plane lands. Therefore, with a wing loading safe for landing it is still possible for a much higher wing loading for taking off. Modern airplanes are able to sustain in full flight much heavier loads than it would be safe to land with and they can be designed to carry much greater expendable loads and still land safely if they could be gotten into the air with such loads. Practical difficulties, however, attend this problem.

In a state of rest or at low speed, the efficiency of the propellers is low and the acceleration of the mass of the airplane is slow. The higher the wing loading, the greater must be the speed attained before the plane can rise into the air. Consequently, in the case of a land plane, a progressive increase in load results in an increased length of run so that ordinarily if such plane were given a load approximating that it could sustain in the air, it would require an impractical long run for takeoff. In the case of a seaplane such an increase in load might prevent it from reaching hydroplaning position and make it incapable of taking off, though it might easily sustain the load if it could be gotten into the air.

The objects of this invention are to enable a heavily loaded airplane to be lifted into the air within a run of normal or practical limits and under acceptable conditions of acceleration; to carry out such operations in a more or less straight fixed path, without requiring the area of a flying field with a variety of runways for facing into the wind; and to provide apparatus which will accomplish the foregoing and will be relatively simple, safe to operate and entirely practical.

The foregoing and other desirable objects are attained by the novel features of construction, combinations and relations of parts hereinafter described, broadly covered in the claims and illustrated by way of example in the accompanying drawings.

The drawings illustrate practical embodiments of the invention, but it will be realized that the structure may be modified and changed as regards this disclosure, all within the true intent and broad scope of the claims.

Figure 1 is a broken side elevation and diagrammatic view illustrating successive stages in the beaching and launching of a seaplane, according to this invention.

Figure 2 is a similar view illustrating successive stages in the placing and launching of a land plane.

Figure 3 is a broken side view illustrating features of the platform or cradle carrying the plane and showing it in the full line position at the left in Figure 2, pitched downwardly to avoid lifting of the plane during the period of acceleration.

Figure 4 is an enlarged view in side elevation of the launching car and propelling car combination illustrated in Figure 1.

Figure 5 is a broken plan view of the launching car as equipped with a cradle for a flying boat or seaplane.

Figure 6 is a broken plan view illustrating diagrammatically the turning of the supporting platform to face the plane into the resultant wind of that caused by forward motion of the truck and cross winds existing at the time.

Figure 7 is a plan view of the propelling and launching car combination first shown in Figure 1.

Figure 8 is a broken side elevation illustrating modifications of the launching car.

Figure 9 is a partly sectional broken detail illustrating a form of releasable lock for the hull of an airplane cradled on the launching car.

For handling seaplanes, the invention may comprise as indicated in Figure 1, a track or runway 11 of a length sufficient for takeoff purposes and extended at the water end as a downwardly inclined underwater ramp 12, and a car 13 operating over such trackway and carrying a cradle or support 14 for a seaplane 15. A cable 16 and capstan 17, or equivalent, may be provided for drawing the car, after the plane has been cradled on its support, up out of the water.

The car may carry its own propulsion means, it may be drawn by cable for acceleration as well as for initial beaching purposes, or it may be propelled by a separate power plant, locomotive or the like. In the illustration, Figures 1, 4 and 7, a separate power truck 18 is provided, driven by light but powerful motors, such as airplane motors 19, operating airscrews 20. This provides a comparatively light weight but extremely powerful propelling unit which will effect rapid acceleration of the launching carriage without slippage and other losses such as would result from driving the wheels for propulsive purposes. Because of construction as a separate unit, this power car can be used with different launching cars or if there are more than one track, be switched over from one to another, to serve different tracks.

For land planes, a ramp such as indicated at 12a, Figure 2, may be provided for loading the plane on the cradle or support 14. The one track may have ramps or other loading means for planes of both types associated with it so that both seaplanes and land planes may be launched from the same track, the different launching trucks or the different styles of launching cradles being substituted as required.

Figure 2 also illustrates the point that the motive power for driving the car up to launching speed may be located on the car in the form of a suitable motor 21. Such a motor may be present merely for shifting the car into position and the like and the actual accelerating be provided by the separate power car 18.

Both Figures 1 and 2 show how the cradle or support may be pitched forwardly to nullify or lessen the "lift" of the wings and resistance to forward motion during acceleration and then be tilted back to a proper angle for takeoff as flying speed is attained. This is accomplished as shown more fully in Figures 3 and 9, by pivoting the cradle or support at 22 for fore and aft tilting movements and by having some means for effecting or controlling the change from a non-flying to a takeoff angle.

In some instances the controls of the airplane may be sufficient, the elevator or equivalent control surfaces being held or secured to rock the plane and support and hold it in a nose-down position, as at the left in Figures 1 and 2, during acceleration and being operated to rock the plane back into the proper angle for takeoff, as at the right, Figures 1 and 2, as flying speed is attained. However, suitable mechanical means may be provided for positively holding and rocking the plane support at the proper times. Thus, as shown in Figures 3 and 4, a toggle lever connection 23 may be made with the pitching table or support and this be actuated and held by an electric, compressed air or other form of motor 24.

In order that the pilot may have absolute control of the takeoff, suitable electrical connections 25, in the case of the electric motor, Figure 3, may be brought up into the pilot's compartment or in a simpler manner, the parts may be so designed and balanced that the effect of the elevators on the plane will be necessary to rock the ship back into the takeoff angle. To assure such an effect means may be provided for thus locating or balancing the plane on the support.

Means for securing the plane in the desired definite relation on the support are indicated particularly in Figures 3, 8 and 9. In Figures 3 a land plane 26 is shown having its axle 27 held by a pair of grapple levers 28 on the upper sliding section 29 of a post 30. These hooks or holding levers 28 are indicated as having angled extensions 31 held spread by a pair of toggle levers 32. The center connection of these toggle levers is shown connected with a slack cable 33 anchored at 34, from which it will be seen that with a definite upward movement of the tilting support, the toggle will be broken to permit the securing members to let go the axle of the craft. The moment of release may be determined by adjusting the length of the tripping connection 33, or means may be provided for pulling this connection at the desired time to release the plane from its support.

In Figure 9 the seaplane hull is shown held to its support by a hook lever 35 which can be tripped by an electrical magnet or motor 36 through the medium of control connections 37 led up into the control compartment of the craft. A spring toggle is indicated at 38 acting on the tail 39 of the hook to make it suddenly let go at the desired instant of takeoff.

The use of a single launching track or runway is made possible in the present invention by mounting the support for the plane so that it may swing to face the plane into the resultant wind effected by forward motion of the car and cross winds existing at the time.

In the several illustrations, the airplane support is mounted on a platform or turntable 40, pivoted to swing about a substantially vertical axis 41. The actual turning to face the plane into the resultant wind may be accomplished in various ways. The direction of the resultant wind may be computed and the rotatable support simply be turned by hand and secured at such angle. Free to rotate, the plane will normally face itself into the resultant wind and the pilot may aid or control this by use of the rudder.

In Figure 6 a motor is indicated at 42 geared to rotate the turntable and controlled by connections 43 to the rudder bar 44, so that power may be applied to positively face the ship in accordance with adjustments of the rudder. In this same view automatic power pointing of the table is illustrated in the form of a windvane 45 which will automatically find the resultant wind and through connections 46 control the motor 42 to face the plane into the resultant wind.

Lateral balance and compensation for unevenness of track are provided for in the illustration by mounting the airplane support 14 so that it may tilt laterally, as by means of the ball joint 22, Figure 9, and by providing shock struts 47 or the equivalent for yieldingly holding the support laterally balanced. This lateral balancing is desirable for the heavier planes, but for lighter planes may be omitted, as indicated in Figure 8, where the cradling support is shown mounted simply for fore and aft pitching on the turntable 40.

The shift from the non-flying to the flying angle may be effected automatically when the proper takeoff speed is reached, as by having the motor 24 an air motor supplied from compressed air tank 48 under control of a valve 49 governed through connections 50 by a Sylphon or like device 51, actuated according to relative air speed from a Venturi or Pitot construction 52, these parts being so designed and arranged that as the decided takeoff speed is attained, the pneumatic device 51 will open the valve to effect operation of the air motor to rock the plane back into the flying angle. These parts are shown carried by extension 53 of the turntable so as to be operable in the various angular relations of the same.

To enable control of the accelerating means from the pilot's compartment, connections for this purpose are indicated at 54, these being severable as the plane leaves the support, as by means of a suitable pullout plug 55. These connections may be such as to control all such functions as propulsion of the launching car, swinging of the turntable to face the plane into the resultant wind, rocking of the cradle to shift the plane from the flying to the non-flying angle, to control the locking or holding of the plane to the cradle and to apply a braking force to the launching car as the plane leaves the cradle. The latter feature is illustrated in Figure 4, where brakes for the launching car are indicated at 56, actuated by a magnet or motor 57 through the medium of control connection 58, forming part of the control connections from the plane.

Thus, the pilot may have absolute control of all necessary functions and may launch the plane or hold connection with the launching car as conditions warrant or require. If takeoff is effected, the necessary control connections are severed and the power unit is shut off and brakes applied. These operations may be aided or to some extent governed by an assistant or assistants on the launching car and propelling car. The propelling car is shown as having a coupling at 59 for pushing the launching car. It will be appreciated that it might have a pulling connection with the same. The power controlling connections 54 from one car to the other may be separable, as indicated at the pullout plug 60, Figure 4.

By using a number of aircraft engine driving propellers, either of the tractor or pusher type, or both, any desired concentration of power required for the desired quick acceleration can be provided without imposing too great a load on the track or runway and without requiring too heavy equipment either in the way of trackage or rolling stock. The engines, where more than one is used, may be arranged abreast, in tandem, one above the other, or any combination of these, to gain the greatest efficiency and they may be on the launching car instead of on a separate power car. Guard rails and wheels, signals and the like may be employed in accordance with safety requirements.

The cradling structure may be varied quite widely to suit different planes. In a simple form, such as shown in Figure 8, there may be just chocks 61, spaced to receive the landing wheels between them and a tail support 62 which can fold down, as in the dotted lines, when the plane is being loaded on the tilting table 14. In this view the tilting means is indicated as a controllable power device 63, such as electrical or compressed air operated, directly connected with the rear edge portion of the tilting structure.

For maximum efficiency, the propeller or propellers of the power car may be of the constant speed, variable pitch type, providing a high rate of acceleration and hence enabling the launching of a heavily loaded plane in a relatively short run. The facing of the plane into the resultant wind enables launching operations to be effected with a single straight track and hence the launching of planes from a narrow restricted way otherwise unsuited to the purpose.

The several features of the invention may be combined in different relations in accordance with particular circumstances or requirements and less than all the features may be used in combination, with desirable results. Thus in some situations, or under some particular wind conditions, the power plant of the airplane may be capable of providing the desired quick acceleration of the launching car. Other possible variations, adaptations and uses of the invention may appear. Such possible variations are contemplated as within the scope of the invention and the claims should be construed accordingly. Further, words and terms employed herein have been used in a descriptive rather than in a limiting sense, except possibly as limitations may be imposed by state of the prior art.

I claim:

1. In combination, an airplane launching car, a horizontally swinging airplane support on said car, an airplane resting on said support, means for accelerating said car up to the takeoff speed of said airplane and releasable locking means for securing said airplane on said swinging support independently of the swinging movement of the same.

2. In combination, an airplane launching car, a horizontally swinging airplane support on said car, an airplane resting on said support, means for accelerating said car up to the takeoff speed of said airplane, locking means for securing said airplane on said support, means for rocking said support to change the position of said airplane from a non-take-off to a take-off attitude, and means connected with said rocking means for automatically releasing said locking means as said takeoff speed is attained.

3. In combination, an airplane launching car, a horizontally swinging airplane support on said car, an airplane resting on said support, means for accelerating said car up to the takeoff speed of said airplane and means for causing said support to face said airplane into the resultant wind of that created by forward movement of the car and existing cross winds.

4. In combination, an airplane launching car, a horizontally swinging airplane support on said car, an airplane resting on said support, means for accelerating said car up to the takeoff speed of said airplane and means for rocking said support to shift said airplane from a non-flying to a flying angle.

5. In combination, an airplane launching car, a horizontally swinging airplane support on said car, an airplane resting on said support, means for accelerating said car up to the takeoff speed of said airplane and means for bodily rocking said airplane from a non-flying to a flying angle as takeoff speed is reached, including a motor on said launching car connected to rock said airplane from a non-take-off to a take-off angle and air speed governed means controlling actuation of said motor.

6. In combination, an airplane launching vehicle, means for accelerating said vehicle up to airplane launching speed, an airplane supporting table rotatable on a substantially vertical axis on said vehicle and an airplane holding cradle mounted for fore and aft tilting movement on said table.

7. In combination, an airplane launching vehicle, means for accelerating said vehicle up to airplane launching speed, an airplane supporting table rotatable on a substantially vertical axis on said vehicle, an airplane holding cradle mounted for fore and aft tilting movement on said table and means for enabling lateral tilting movements of said cradle.

8. In combination, an airplane launching vehicle, means for accelerating said vehicle up to airplane launching speed, an airplane support mounted for angular adjustment about a vertical axis and for fore and aft tilting movements on said vehicle, an airplane resting on said support, releasable locking means for holding said airplane to said support and means controllable from said airplane for controlling said vehicle accelerating means and the fore and aft tilting and releasing of said airplane.

9. In combination, an airplane launching car, means for accelerating the same up to airplane launching speed, means on said car for supporting an airplane thereon at a non-flying angle during acceleration and for shifting the same to a takeoff angle as flying speed is reached, and means on said launching car operative independently of said supporting and shifting means for facing an airplane supported on said car into the resultant wind of the forward speed of the car and cross winds existing at the time.

10. In combination, an airplane launching vehicle, an airplane support thereon, an airplane on said support, means for accelerating the vehicle up to the takeoff speed of said airplane, means for locking the airplane to said support, means on said car for rocking the support to shift the airplane from a non-flying to a flying angle as takeoff speed is attained and means operable by movement of said support from a non-take-off to a take-off angle for effecting the release of said locking means as takeoff speed is reached.

11. Apparatus for launching an airplane in flight comprising an airplane carrier, means for quickly accelerating the same to airplane takeoff speed and a support mounted to face an airplane on said carrier from the direction of travel of said carrier into the component wind direction resultant from said flight launching movement of said carrier and existent cross winds.

12. In combination, an airplane launching vehicle, means for quickly accelerating said vehicle up to airplane launching speed, an airplane support rotatable on a substantially vertical axis on said vehicle for enabling the facing of an airplane thereon into the resultant wind of the forward motion of said vehicle and existing cross winds and means for enabling lateral tilting movement of said rotatable airplane support.

13. Apparatus for launching an airplane in flight, comprising an airplane carrier, means for quickly accelerating the same to airplane takeoff speed, a rotatable support mounted to face an airplane on said carrier from the direction of travel of said carrier into the component wind direction resultant from said flight launching movement of said carrier and existent cross winds and means for effecting the holding of an airplane on said support during acceleration to takeoff speed and for enabling freeing of the airplane from said support when takeoff speed is attained.

14. Apparatus for launching an airplane in flight, comprising an airplane carrier, means for quickly accelerating said carrier up to airplane takeoff speed and an airplane support rotatably mounted on said carrier and having means for positioning and holding an airplane thereon, said support being freely rotatable about a vertical axis to enable said support to freely swing an airplane held thereon into the component wind direction resultant from the flight launching movement of said carrier and existent cross winds.

15. Apparatus for launching an airplane in flight, comprising an airplane carrier, means for quickly accelerating said carrier up to airplane takeoff speed, an airplane support rotatably mounted on said carrier, motor means for shifting said support to face an airplane thereon into the wind resultant from forward accelerating movement of the carrier and existent cross winds, a wind vane device mounted on said carrier for finding the resultant wind and control connections from said wind vane device to said motor for effecting automatic power pointing of said rotatable airplane support.

16. Apparatus for launching an airplane in flight, comprising an airplane carrier, means for quickly accelerating said carrier up to airplane takeoff speed, a turntable rotatably mounted on said carrier and a support for an airplane mounted on said turntable and provided with means for holding an airplane in definite position in respect to said turntable to enable facing of the airplane into the wind resultant from forward acceleration of the carrier and existent cross winds and operable to release an airplane held on the support on attainment of airplane takeoff speed.

17. Apparatus for launching an airplane in flight, comprising an airplane carrier, means for quickly accelerating said carrier up to airplane takeoff speed, a turntable rotatably mounted on said carrier and a support for an airplane mounted on said turntable and provided with means for holding an airplane in definite position in respect to said turntable to enable facing of the airplane into the wind resultant from forward acceleration of the carrier and existent cross winds and operable to release an airplane held on the support on attainment of airplane takeoff speed, said airplane holding support being mounted for universal fore and aft and lateral tilting movements on said turntable to control pitch and lateral stability of an airplane on the support during acceleration periods.

FRANCIS T. COURTNEY.